(No Model.)

J. P. ABBOTT.
EAVES TROUGH ANGLE OR MOLDING.

No. 435,552. Patented Sept. 2, 1890.

WITNESSES
C. Honsberg
H. Clark Ford

INVENTOR
J. P. Abbott
W. H. Burridge
Atty

UNITED STATES PATENT OFFICE.

JONATHAN P. ABBOTT, OF CLEVELAND, OHIO.

EAVES-TROUGH ANGLE OR MOLDING.

SPECIFICATION forming part of Letters Patent No. 435,552, dated September 2, 1890.

Application filed March 10, 1890. Serial No. 343,378. (No model.)

*To all whom it may concern:*

Be it known that I, JONATHAN P. ABBOTT, of Cleveland, county of Cuyahoga, and State of Ohio, a citizen of the United States, have invented certain Improvements in Eaves-Trough Angles or Moldings, of which the following is a specification.

The nature of my invention relates to the manner of forming the angles in metal eaves-troughs, ceilings, and moldings.

That the invention may be fully understood in its purpose and construction, reference is made to the following description thereof, in connection with the accompanying drawings.

Figure 1:
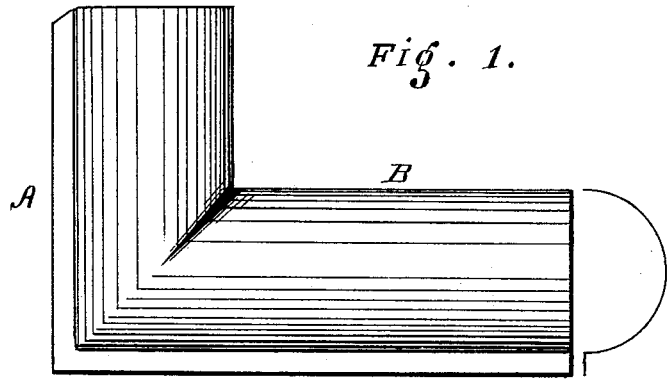
Figure 2:
Figure 3:
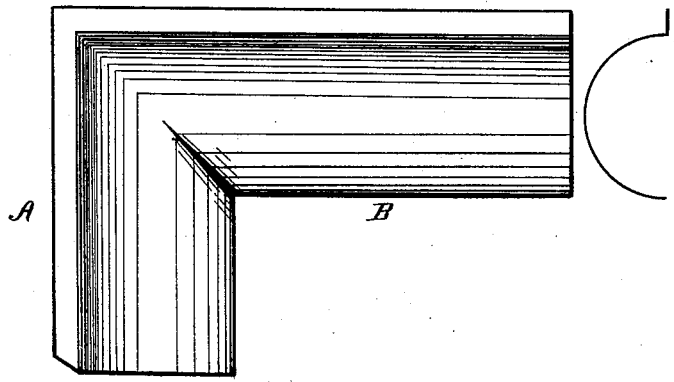

Figure 1 represents the concave side of the said improved eaves-trough angle or molding-angle. Fig. 2 is a horizontal view of said angle. Fig. 3 illustrates the concave side of said trough-angle.

Like letters denote like parts in the specification and drawings.

The sheet-metal angle for eaves-troughs, a new article of manufacture, is from one piece of metal in various dimensions, according to the size and proportions of the required concavo-convex angle. This metal blank is now subjected to the compressing action of drop dies or stamps of the required configurations, which form the matrix for producing the said article, which may be in various proportions and divers angles within the scope of my invention. By this means of making said article there is a material saving in labor, time, and material, as in the manufacture of eaves-trough angles in the ordinary way a miter-joint has to be formed, and this joint of the sections soldered together, whereby there is a waste of material in cutting the joint, and also extra labor in so doing, with additional time and material in soldering the joints to make the angle. In the formation of said new article of manufacture there is no cutting of miters or soldering of joints, as is necessary in the usual way, or lapping one section of the mitered pieces over the other in order to solder the two mitered sections securely together, thereby forming a rough joint—an obstruction—which is avoided by my invention, as it is made in one piece, and struck up therefrom by one continuous operation by the compressing action of dies or stamps, which can be operated in various known ways. In the manufacture of eaves-trough angles and for ornamental purposes one branch of the angle A, Fig. 1, can be one size, while the other branch B may be of a different size. This difference in the sections of the angle is desirable in architectural constructions and ceilings, which cannot be done in the old way without showing a broken and unsightly joint.

What I claim as my improvement, and desire to secure by Letters Patent, is—

A new article of manufacture, consisting of angle-sections of concavo-convex moldings or troughs in one piece of sheet metal struck or pressed up therefrom into shape, substantially as and by the means set forth.

In testimony whereof I affix my signature in presence of two witnesses.

JONATHAN P. ABBOTT.

Witnesses:
W. H. BURRIDGE,
N. W. HARTMAN.